UNITED STATES PATENT OFFICE

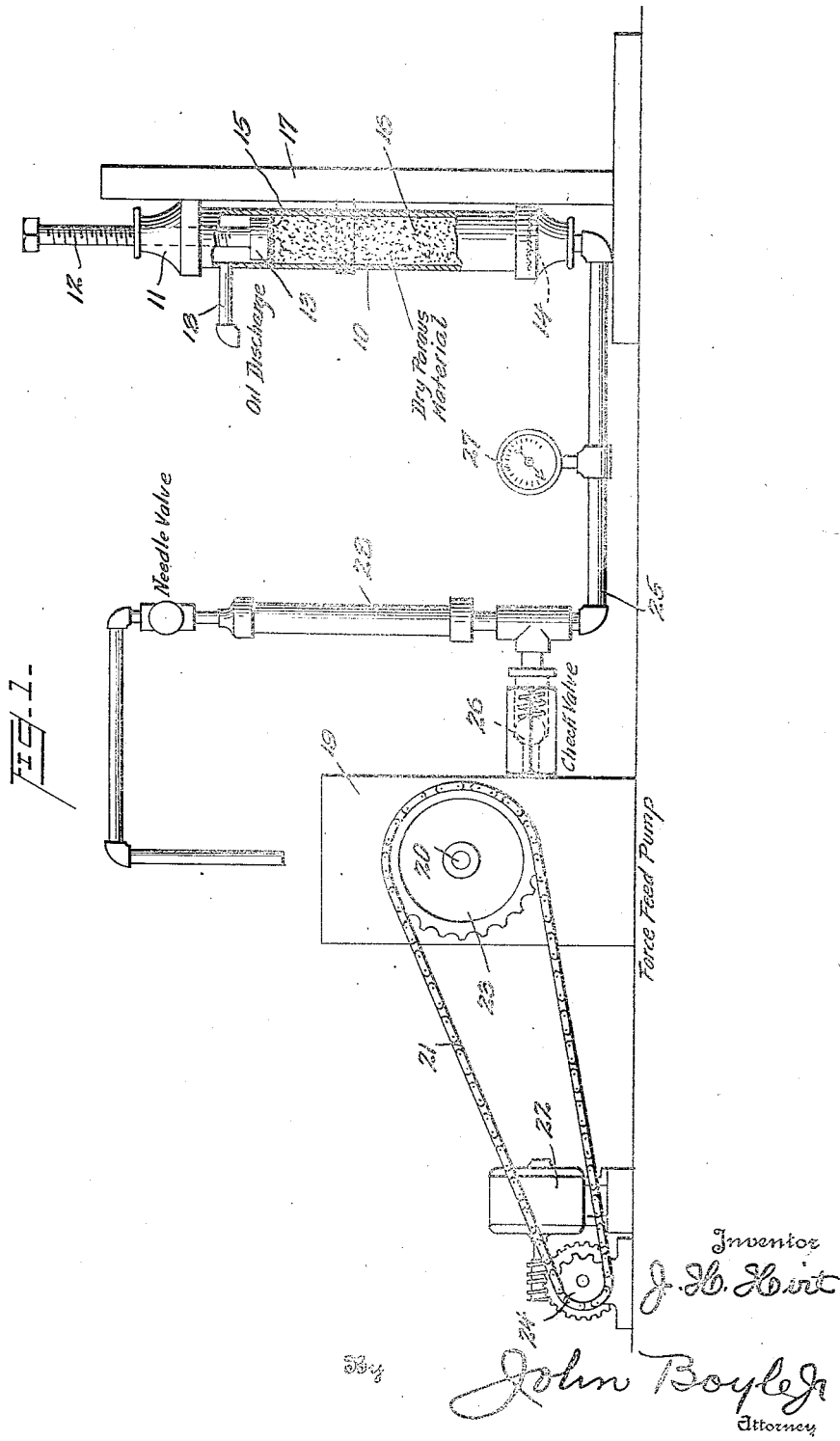

JULES H. HIRT, OF EL PASO, TEXAS; HARRIET M. HIRT, EXECUTRIX OF SAID JULES H. HIRT, DECEASED, ASSIGNOR TO L. J. HIRT, OF NEW YORK, N. Y.

PRESSURE TREATMENT FOR OILS AND THE LIKE

Application filed April 23, 1929. Serial No. 357,531.

My invention relates to a pressure treatment for removing certain substances or compounds from oils and other liquids. In the processing of many oils and liquids, there is generally required a purification, clarification, or filtration operation. In many cases, it is practically impossible to economically remove the colloidal and other substances from the liquids by the regular methods now in use.

I have discovered that even colloidal coloring matter can be easily removed from a liquid by my pressure contact process when carried out under proper mechanically controlled conditions. I take a suitable porous substance, powdered extremely fine, place it in a suitable receptacle and subject it to a high controlled mechanical pressure. The substance becomes so compacted by this high pressure that only the most minute pores exist in the mass.

If, through this highly compressed mass, certain liquids are forced under pressure, surprising results are attained.

For example, if a certain quantity of refined motor oil, having the usual red or brown color, is forced through a certain quantity of a highly compressed suitable porous material, the treated oil becomes blue-white in color, the process having removed the colloidal impurities from the oil. Using the same proportions of oil and porous material in the ordinary methods does not remove the color.

Another example is the removal of certain sulphur compounds from petroleum liquids. If the petroleum liquid containing the sulphur compound is forced under high pressure through a suitable finely powdered highly compressed material, all the sulphur compounds will be removed at ordinary temperature. Any other method of contact of chemicals and petroleum liquids does not remove the sulphur compounds.

Another surprising result is the conversion of part of the heavy black crude oil of 28°–30° Bé. gravity, into very light yellow 67°–70° Bé. gravity oil by simply forcing the crude black oil under high pressure through suitable highly compressed mineral matter, at ordinary temperatures.

When crude cottonseed oil is forced under high pressure through a suitable highly compressed filtering substance, the colloidal and suspended matters are completely removed and the filtered oil will not turn rancid even after an extended period of time.

Certain mineral matter, that has no color removal property under ordinary conditions on certain oils, when used in the pressure treatment process develops remarkable color removal properties on the same oils using the same proportions.

Observation indicates that the flow of the liquid under high pressure through the dense compacted mass is a very different physical action than ordinary percolation or low pressure filtration.

Under proper conditions, with suitable highly compressed substances, the forcing of suitable liquids through the dense compacted mass gives desirable results with a great many different kinds of liquids such as oil, coffee, ink, milk and water with dissolved salts, and appears to be of general application, where the regular methods do not give the results desired.

For carrying out my process I have shown a suitable apparatus in the drawing by way of exemplification.

The figure is an elevation of the apparatus.

Into the container 10, which is about 2 inches in diameter and 12 inches long, I place the dry porous material 16. Secured to the top of the container 10 is the cover 11 and in screw threaded engagement with the cover is the screw bolt 12. Secured to the lower end of the bolt 12 is a washer 13 that fits loosely in the container. A cotton cloth plug 14 is placed in the bottom of the container and another cotton cloth plug 15 is placed under the washer and on top of the porous material. The porous material, having been placed in the container in a loose form, is compressed by turning the screw 12 to about 700 lbs. per square inch.

The container 10 is mounted on a support 17 and has a discharge outlet 18 for the treated liquid.

Any suitable or conventional means may be utilized for forcing the liquid through the compressed mass at the desired pressure of about 500 lbs. per square inch. That shown comprises a force feed lubricator type of pump 19, the shaft 20 having a speed of 10–20 R. P. M. and being driven through a sprocket chain 21 by a motor 22 engaging sprockets 23 and 24. The pipe line 25 has a check valve 26, gage 27, and an air chamber 28 with a needle valve 29 to vent out any entrained air and is connected to the bottom of the chamber 10.

For petroleum oils it has been found that a porous volcanic ash is a suitable filtering material. This material does not become colloidal when mixed with water and usually has practically no water content when mined. Its composition will vary from nearly pure silica to silicate of alumina with other impurities. The filtering material must have a porosity and not flow together as a dense impermeable mass when subjected to 500 or more pounds per square inch after being ground to 200 mesh. Ordinary clay which becomes colloidal when mixed with water, on account of its lack of porosity, is not suitable. A material of the nature of colloidal clay when compressed in the container 10 by the screw 12, within a short time after the oil is forced through the mass under high pressure, 1200 to 2000 lbs. per square inch, will invariably bore a channel between the side of the container and the compressed mass. With porous-non-colloidal substances this has never occurred although equally high pressures have been used under severe jerky conditions of several hundred pounds variation in a second, by gauge observations.

I have also discovered that if the porous material is ground through 40 mesh, there seems to be enough very fine powder when the entire mass is highly compressed to equal the results obtained by grinding all the porous material through 350 mesh. In other words, there seems to be about the same amount of voids or less in the 40 mesh porous material and the 350 mesh powdered porous material. This may be due to the air film surrounding each particle.

This is of much practical importance in the cost of grinding. Experience also shows that a greater pressure is required to pump through the 40 mesh compressed mass than through the 350 mesh compressed mass under equal conditions of compacting pressure.

The term porous condition is relative to the amount of pressure used, in forcing the liquid through the mass. For economic reasons it is not desirable to exceed the ordinary pipe fittings working pressure hence I have tried to keep it below 500 lbs. Good results have also been obtained at 100 to 250 lbs. pressure treatment under certain conditions.

The following specific case of pressure treatment of a petroleum oil as compared to the regular gravity treatment shows the surprising results obtained.

An ice machine oil was selected which was of asphalt base and had the following properties. It froze only below zero, its viscosity at 100° F. was 110, its color was a light amber, and its odor was asphaltic. The problem was to remove the light amber color and make it light lemon or blue-white in color.

This ice machine oil had been acid treated, washed, alkali treated, washed and clayed, followed by filter pressing at about 50 lbs. pressure. To this oil, a porous volcanic ash was added in the form of a powder of 350 mesh and agitated for 24 hours. This process was repeated after filtering off the previous charge of ash powder, 10% of the weight of oil. After the tenth operation, requiring at least ten days, the oil had not changed any in color or odor. If the same weight of volcanic ash, as in the contact method of treating, and ground to 350 mesh, is put in a container and then the ice machine oil poured on top of the tamped mass, it will take about six months for the oil to percolate through this finely powdered non-colloidal mass and the oil will be blue-white in color, with much of the asphaltic odor removed.

If the same weight of 350 mesh porous volcanic ash is compressed in the cylinder 10, to about 700 lbs. per square inch, and then force the oil through the compressed mass at about 500 lbs. per square inch, the oil will be blue-white in color and practically all the odor will be removed and the oil becomes nearly tasteless in a few hours' time of processing at ordinary temperatures.

In percolating a lubriciating oil, for example, through a layer of the coarse porous material or pumping the mixture of oil and powdered material into a filter press at ordinary pressures of about 50 lbs. per square inch, the mass or cake retains from 75 to 80% of oil. In my high pressure treatment process, the dense compressed mass retains only from 30 to 35% of oil.

In the bleaching of oils, by the use of bone char percolators under gravity or low pressure treatment, about 10% of the weight of the bone char charge in oil will come through colorless. This same colorless liquid cannot be obtained by powdered bone char if used by the contact agitating process even if much more powdered bone char is used in proportion to the quantity of oil.

When the powdered bone char (a porous substance) is put into the compressor of my high pressure treatment process, compressed to a compact mass and the oil forced through this compressed bone char, using the same oil as used in the percolator type of treatment, I have discovered that the colorless oil will be in much greater proportion to the amount of bone char and usually exceeds the weight of bone char charged into the compressor.

That is, the yield is from 3 to 10 times the amount of colorless oil from the same weight of bone char as was used in the percolator type of treatment, the standard process now used for this purpose.

This great advantage of much higher capacity of the porous material to retain and remove certain impurities in oils and liquids is of substantial economic importance and makes the process very desirable.

I have also discovered that the oil so treated by the pressure treatment process has much greater wearing properties on high speed cotton spindles. In a test with the pressure treatment process this oil did not change color in a year's run at 8500 R. P. M., whereas the same refined oil untreated gets black in color in 6 weeks' time. Another test on jumbo spindles at 3500 R. P. M. gave similar results.

Transformer oil when treated by the pressure treatment process becomes blue-white in color and its di-electric strength is raised nearly 100% over the regular best oil now on the market.

My pressure treatment process can use other materials than those specified. In my copending application, Ser. No. 349520, filed March 23, 1929, I have disclosed a compound for treating petroleum base oils to remove foul smelling and sulphur compounds which is a dry porous reaction product of a caustic alkali solution, litharge and caustic lime. If this product is compressed in the specified manner, certain oils which will not give up their sulphur content by the ordinary process of treatment will do so quickly when forced through the dense compressed compound at high pressure.

The phenomena involved while not fully understood may be explained in part as follows:

It is believed with petroleum liquids that the impurities are associated with colloidal dissolved and emulsified substances and if they are forced through extremely fine pores in a porous material that they are thereby retained by the particles of the material.

When the chemical compound of my copending application is used in the compressor, the reaction probably takes of the nature similar to highly compressing copper with sulphur which forms copper sulphide without the requirement of heat by the high pressure alone of the two elements.

While the apparatus shown in Fig. 1 discloses upward forcing of the liquids through the compressed material in the compressor, tests have been made forcing the liquid down through the compressed mass. This mode of operation, while effective, is not as practical in all cases as forcing the liquid up through the compressed mass.

I have discovered that in forcing a liquid through the compressed porous mass, that there is about 50% more resistance when the air has not been displaced than where the liquid is forced through after the air has been displaced.

It should be understood that there is no greater pressure at the top of the compressor than at the bottom and it takes less pressure to force the liquid through the mass after the air has been displaced.

With substances of a colloidal nature when mixed with water, if compressed into a compact mass, it requires a much greater pressure to force the liquid through the compact mass after the air has been displaced.

Different pressures have been tried on the same material for color removal, and it has been found that there is a certain maximum pressure of compressing the filtering material and a certain maximum liquid forcing pressure which is the most economical. Generally it is aimed to have the pumping pressure not to exceed 300 to 500 lbs. per square inch although good results with the same liquids and filter materials have been obtained at lower pressures of 100 to 200 pounds per square inch with much longer time of contact.

Some tests made at 1000 pounds per square inch pumping pressure gave results which could not be obtained at lower pressure. Most of these tests were of the nature of breaking down a sulphur compound in lubricating oils with the chemical compound referred to in my copending application.

The removal of the compacted mass after an oil has been forced through it has become a simple operation in discharging the compressor. The bottom fitting is removed and with a few blows of a hammer the compressed mass slides out as one cylinder. Removal of the compact mass by digging it out is a more difficult task, of several hours hard work, as the mass is about like neat Portland cement concrete in hardness when in the compressor, until it is jarred with a few blows of a light hammer when it becomes like erasing rubber.

Another point of practical interest is that after the compressor is once set at its pressure on the dry material and the oil (for instance) has displaced the air in the compacted mass, it cannot be screwed up to increase or decrease the pressure, without the liquid coming over immediately carrying much of the substances that were held in the filter material and the liquid will not discharge from the compressor clear again, until a fresh new charge of dry material has been placed in the compressor and compacted to its initial desired pressure, and strictly left alone while the liquid is being forced through it.

Starting and stopping at time intervals of days has no objectionable effect on the discharge liquid in color or clearness.

I claim:

1. The process of removing colloidal and emulsified substances from petroleum oils comprising highly compressing a comminuted porous volcanic ash to the point that the contact spaces between the particles of the material are substantially eliminated and the oil must flow through the pores of the said material and then forcing the oil through the dense compacted mass.

2. The process of removing colloidal and emulsified substances from oils comprising highly compressing a comminuted porous volcanic ash to the point that the contact spaces between the particles of material are substantially eliminated and then forcing the oil through the pores of the dense compacted mass.

3. A filter material comprising a highly compressed comminuted porous volcanic ash substantially free from any contact spaces between the particles of material and characterized by the property of permitting the passage of a liquid through the pores only under substantial pressure.

4. The process of removing colloidal and emulsified substances from petroleum oils, comprising compressing a comminuted porous material to about 700 lbs. per square inch so that any contact spaces between the particles are substantially eliminated, and then forcing the oil through the pores of the dense compacted mass at about 500 lbs. per square inch.

5. The process of removing colloidal and emulsified substances from petroleum oils, comprising compressing comminuted porous volcanic ash to about 700 lbs. per square inch so that any contact spaces between the particles are substantially eliminated, and then forcing the oil through the pores of the dense compacted mass at about 500 lbs. per square inch.

In testimony whereof I affix my signature.

JULES H. HIRT.